US010228665B1

(12) United States Patent
Neely et al.

(10) Patent No.: US 10,228,665 B1
(45) Date of Patent: Mar. 12, 2019

(54) EMULATOR FOR ROTARY ENERGY SOURCES

(71) Applicant: National Technology & Engineering Solutions of Sandia, LLC, Albuquerque, NM (US)

(72) Inventors: Jason C. Neely, Albuquerque, NM (US); Steven F. Glover, Albuquerque, NM (US); Forest Eugene White, Albuquerque, NM (US); Jason Ryan Finn, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 792 days.

(21) Appl. No.: 14/175,395

(22) Filed: Feb. 7, 2014

Related U.S. Application Data

(60) Provisional application No. 61/827,188, filed on May 24, 2013.

(51) Int. Cl.
*G05B 13/04* (2006.01)

(52) U.S. Cl.
CPC .................................... *G05B 13/04* (2013.01)

(58) Field of Classification Search
CPC ........ G05B 15/00; G05B 15/02; G05B 17/00; G05B 17/02
See application file for complete search history.

(56) References Cited

U.S. PATENT DOCUMENTS

| 5,459,664 A * | 10/1995 | Buckalew | G01M 13/00 123/357 |
|---|---|---|---|
| 2006/0113801 A1 * | 6/2006 | Schubert | F03D 1/003 290/44 |
| 2008/0168092 A1 * | 7/2008 | Boggs | G06F 17/5022 |
| 2012/0292904 A1 | 11/2012 | Tarnowski | |
| 2013/0115045 A1 * | 5/2013 | Korac | F03B 17/064 415/8 |
| 2013/0131956 A1 * | 5/2013 | Thibault | F02D 45/00 701/102 |

OTHER PUBLICATIONS

Neely et al.; "Wind Turbine Emulation for Intelligent MicroGrid Development"; Mar. 1, 2012; Sandia National Laboratories.*
Glover, et al., "Secure Scalable Microgrid Project at Sandia National Laboratories", retrieved at <<http://e2rg.com/microgrid-2012/Sandia_Guttromson_Glover.pdf>>, Retrieval Date: Oct. 4, 2013, pp. 1-29.
(Continued)

*Primary Examiner* — Umut Onat
(74) *Attorney, Agent, or Firm* — Daniel J. Jenkins

(57) ABSTRACT

An emulator is described herein, wherein the emulator is configured to emulate a rotary energy generator. The rotary energy generator can be one of a wind turbine, a diesel engine, or a hydrokinetic generator. The emulator includes an electromechanical motor that is mechanically linked to a generator. A motor drive is electrically coupled to the electromechanical motor, and controls torque at a rotor of the electromechanical motor. Electromagnetic torque produced by the generator is estimated, and the motor drive is controlled based upon the estimated generator torque.

22 Claims, 6 Drawing Sheets

(56) References Cited

OTHER PUBLICATIONS

Lopes, et al., "A Wind Turbine Emulator that Represents the Dynamics of the Wind Turbine Rotor and Drive Train", PESC 2005, Jun. 15, 2005, pp. 2092-2097.

Neammanee, et al., "Development of a Wind Turbine Simulator for Wind Generator Testing", International Energy Journal, vol. 8, 2007, pp. 21-28.

Monafred, et al., "Static and Dynamic Wind Turbine Simulator Using a Converter Controlled DC Motor", Renewable Energy vol. 33, 2008, pp. 906-913.

* cited by examiner

EMULATOR FOR ROTARY ENERGY SOURCES

CROSS-REFERENCE TO RELATED APPLICATION

This application claims priority to U.S. Provisional Patent Application No. 61/827,188, filed on May 24, 2013, and entitled "EMULATOR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Given the continuous improvements in technologies that can generate electrical energy from renewable resources (e.g., wind turbines, solar panels, wave energy converters (WECs), etc.), microgrids are becoming a viable alternative or supplement to the conventional electrical grid. A microgrid can comprise, for example, a plurality of energy sources, at least one of which can be independently operated. An exemplary microgrid may additionally include devices (e.g., batteries, capacitor banks, etc.) for retaining excess electrical energy and discharging energy when an energy deficit exists. Furthermore, a microgrid may include energy generators that output energy using non-renewable resources, such as a diesel engine-driven generator.

Currently, however, it is difficult to design a microgrid and/or modify an existing microgrid due to the lack of mechanisms for testing componentry of the microgrid and interaction between componentry of the microgrid. For example, a wind turbine is too large to be deployed in most laboratory settings. Accordingly, if testing a control system that is used to balance sources and loads in a microgrid that includes a wind turbine is desired, two options are currently available: 1) purchase and deploy the wind turbine in the microgrid, assuming the risk that the wind turbine and/or control system will not operate as desired; or 2) to test the control system entirely in software through simulation of the wind turbine. The second approach, however, may not be desirable, as the simulation may not accurately reflect the physical wind turbine.

SUMMARY

The following is a brief summary of subject matter that is described in greater detail herein. This summary is not intended to be limiting as to the scope of the claims.

Described herein are various technologies pertaining to the emulation of a rotary energy generator, such as a wind turbine-drive generator (wind turbine), a hydrokinetic generator, a diesel engine-driven generator (diesel engine), or other rotary energy generator that may be included in a microgrid. An emulator can include an electromechanical motor-generator pair, a motor drive that is configured to drive the electromechanical motor, and a computing apparatus that provides control instructions to the motor drive. The emulator can be configured to emulate any of a plurality of selectable rotary energy generator types, such as those listed above. Thus, for example, the emulator can first be caused to emulate a wind turbine, and may subsequently be caused to emulate a hydrokinetic generator. Moreover, the emulator can be configured to emulate a rotary energy generator without the need for a torque sensor. Instead, generator torque can be estimated as a function of rotational velocity of a rotor of the electromechanical motor. This is advantageous, as torque sensors tend to be relatively expensive (on the order of several thousand dollars).

In an exemplary embodiment, the computing apparatus of the emulator can be configured with emulation instructions for a plurality of different types of rotary energy generators. Emulation instructions for each type of rotary energy generator can include, for example, respective controller instructions that are based upon a mathematical model of a respective type of rotary energy generator. The controller instructions can be provided with an input profile (e.g., a wind velocity profile, a wave velocity profile, etc.), and can be configured to output a control signal based upon the input profile and estimated generator torque. The control signal can be indicative of a desired torque and/or rotational velocity of the electromechanical engine rotor, and can be provided to the motor drive. In an exemplary embodiment, the motor drive, off-the shelf, has direct torque control capability, such that the motor drive need not be modified.

An amount of electrical energy output by the emulator (e.g., from the generator of the emulator) can be analyzed when the emulator is emulating a particular type of rotary energy generator. Furthermore, a load can be coupled to the emulator, wherein output of the emulator and/or response of the load can be monitored in connection with analyzing response of a microgrid to the inclusion of the rotary energy generator being emulated by the emulator.

The exemplary system set forth above is associated with numerous advantages over conventional systems. For example, a particular type of rotary energy generator can be subjected to testing and analysis in a laboratory environment; thus, the rotary energy generator need not be purchased and deployed. In another example, as noted above, the motor drive need not be modified when implementing an exemplary emulator. Instead, for instance, an off-the-shelf motor drive (configured with direct torque control capabilities) can be provided with control signals that cause the motor drive to control the torque and/or rotational velocity of the rotor of the electromechanical motor. Further, a microgrid having a plurality of energy sources can be emulated based at least in part upon emulators described herein. For instance, using three emulators, a microgrid having a hydrokinetic generator, a wind turbine, and a diesel engine-driven generator can be emulated through use of three emulators as described above. Such microgrid can be emulated in a laboratory environment (e.g., in a relatively small space).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
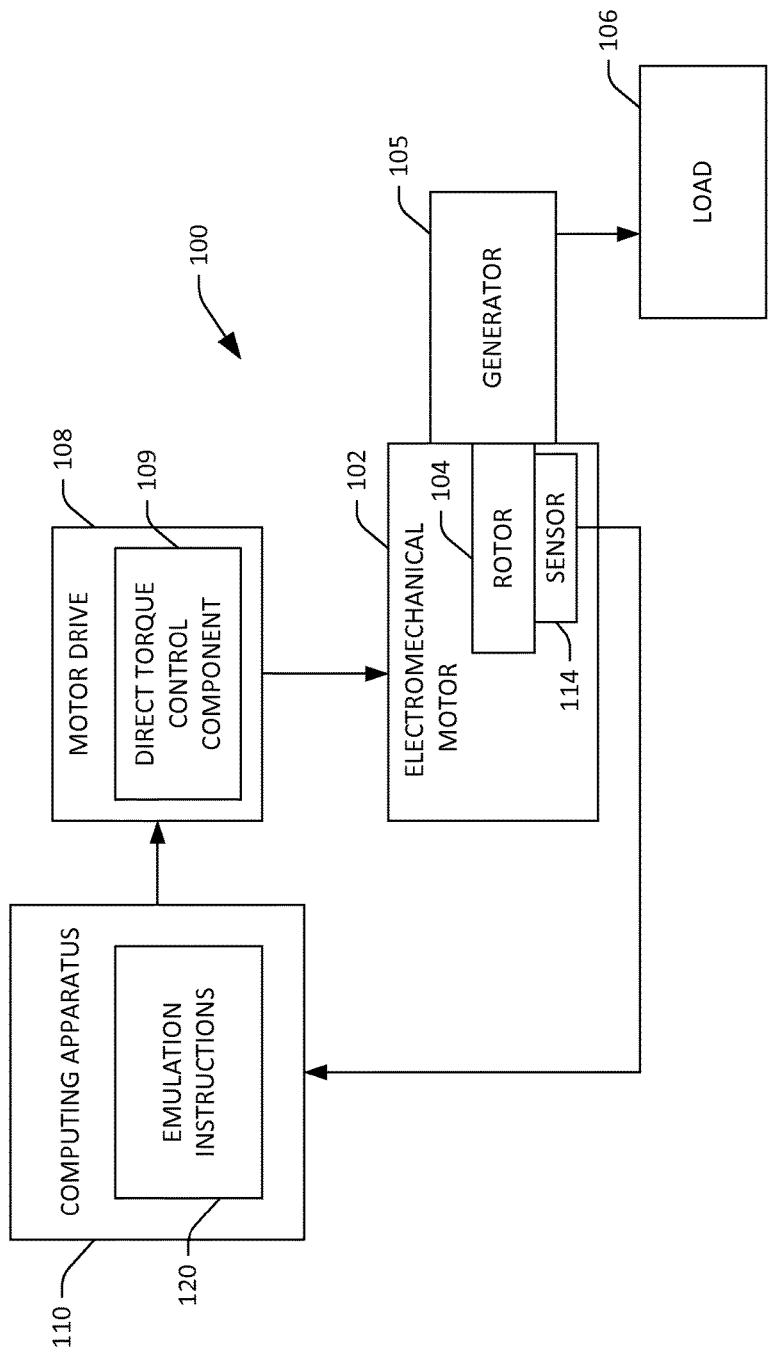
FIG. 1 is a functional block diagram of an exemplary system that facilitates emulating a rotary energy generator from amongst a plurality of rotary energy generators.

Various technologies pertaining to emulation of rotary energy generators are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. The terms "component" and "system" are also intended to encompass circuitry that cause certain functionality to be performed. It is also to be understood that a component or system may be localized on a single device or distributed across several devices. Additionally, as used herein, the term "exemplary" is intended to mean serving as an illustration or example of something, and is not intended to indicate a preference.

Described herein are various technologies pertaining to emulation of rotary energy generators. With more particularity, an emulator is described herein, wherein the emulator includes an electromechanical motor-generator pair that can be caused to emulate a rotary energy generator, such as a diesel engine-driven generator (diesel engine), a wind turbine-driven generator (wind turbine), a hydrokinetic generator, etc. The term "emulate", as used herein, refers to the emulator acting in conformance with a mathematical model of a rotary energy generator, wherein the mathematical model defines responses of the rotary energy generator to received stimuli. For example, with respect to a wind turbine, the mathematical model can describe the output of a rotary shaft based upon blade size, wind velocity, current state, etc. Exemplary mathematical models of exemplary rotary energy generators are set forth herein.

With reference now to FIG. 1, an exemplary emulator 100 that can be configured to emulate a selected rotary energy generator from amongst a plurality of selectable rotary energy generators is illustrated. The system 100 includes an electromechanical motor 102, which may be an induction motor, a permanent magnet synchronous motor, a brushless DC motor, a DC motor, a switched reluctance motor, or the like. The electromechanical motor 102 includes a rotor 104, wherein the rotor 104 is caused to rotate responsive to the electromechanical motor 102 receiving current.

The emulator 100 further includes a generator 105 that is mechanically coupled to the rotor 104 of the electromechanical motor 102 by way of a suitable linkage. Such linkage can include a shaft, gearing, etc. The generator 105 outputs electrical energy responsive to the rotor 104 rotating. While shown as being separate devices, it is to be understood that the generator 105 can be integrated into the electromechanical motor 102. A load 106 can be electrically coupled to the generator 105, wherein the load 106 consumes electrical energy output by the generator 105.

A motor drive 108 is electrically coupled to the electromechanical motor 102. The motor drive 108 is an adjustable speed drive that is configured to control torque applied to the rotor 104 as well as rotational velocity of the rotor 104. Thus, the motor drive 108 can include a direct torque control component 109 that is configured to cause the motor drive 108 to output a signal that, when received by the electromechanical motor 102, causes a desired torque to be applied at the rotor 104.

The emulator 100 additionally comprises a computing apparatus 110 that is in communication with the motor drive 108. For example, the computing apparatus 110 may be electrically coupled to the motor drive 108 by way of Ethernet cabling. In another example, the computing apparatus 110 may be in communication with the motor drive 108 by way of a suitable wireless connection (e.g., RF or optical). As will be described in greater detail herein, the computing apparatus 110 can be configured to output control signals to the motor drive 108, which then cause the motor drive 108 to control the electromechanical motor 102.

The emulator 100 further comprises a sensor 114. For example, the sensor 114 can be configured to detect at least one parameter corresponding to the rotor 104 of the electromechanical motor 102. For instance, the sensor 114 can be configured to output a signal that is indicative of rotational velocity of the rotor 104. Such signal can be provided, for example, to the computing apparatus 110.

The emulator 100 may be advantageously employed in a laboratory setting. For example, the emulator 100 may be employed in connection with emulating at least one rotary energy generator that may be included in a microgrid. The emulator 100 is advantageous over conventional approaches, as the actual rotary energy generator need not be operated to perform testing and/or design of a control system that is configured to balance energy generated, consumed, retained, and discharged in a microgrid. Instead, the emulator is caused to emulate the rotary energy generator, thereby facilitating testing corresponding to the rotary energy generator without having to purchase and deploy the rotary energy generator. Furthermore, multiple emulators can be utilized simultaneously, thereby facilitating development and testing of controls used in a microgrid.

Operation of the emulator 100 is now described. The computing apparatus 110 can be programmed with emulating emulation instructions 120. The emulation instructions 120 can include instructions for presenting a graphical user interface to a user, wherein the graphical user interface comprises a plurality of selectable rotary energy generators that can be emulated by the emulator 120. A user of the emulator 100 may select any of the selectable rotary energy generators, and the emulator 100 can be configured to emulate the selected rotary energy generator. Accordingly, the emulator 100 can be configured to emulate any of a plurality of different types of rotary energy generators.

The emulation instructions 120, as will be described in greater detail below, include a respective control component for each type of rotary energy generator that can be emulated by the emulator 100, as well as a respective generator torque estimator component that can estimate electromagnetic torque produced at the generator 105. A control component is based upon a mathematical model of the rotary energy generator that is to be emulated by the emulator 100. A mathematical model for a rotary energy generator defines responses of the rotary energy generator to stimuli based upon a current state of the rotary energy generator, wherein the state can include torque on a shaft of the rotary energy generator, rotational velocity of the shaft of the rotary energy generator, parameters corresponding to a load attached to the rotary energy generator, etc.

Responsive to the rotary energy generator being selected from amongst the plurality of selectable rotary energy generators, the control component for such rotary energy generator can be loaded into memory of the computing apparatus 110, and the control component can be executed by a processor of the computing apparatus 110. Additionally, an input profile can be received, wherein the input profile can define stimuli that is applied to the rotary energy generator over time. For example, if the rotary energy generator is a wind turbine, the input profile can define wind velocities and direction relative to time. In an exemplary embodiment, while not shown, a master control computer can provide such input profile, and the computing apparatus 110 can receive the profile over a relatively fast data connection (e.g., Ethernet). For instance, the input profile can be reference speed (RPM) when the diesel engine is emulated, wind speed (m/sec) when the wind turbine is emulated, and wave height (m) or water speed (m/sec) when a hydrokinetic energy generator is emulated (e.g., a river turbine or a point source wave energy converter (WEC)).

The control component can receive such input profile, and can further receive output of at least the sensor 114, which can be indicative of rotational velocity of the rotor 104. The control component, based upon the rotational velocity of the rotor 104 and estimated generator torque (electromagnetic torque produced by the generator 105), can output a (discrete time) control signal to the motor drive 108. The control signal can be indicative of a desired torque to be applied to the rotor 104.

As noted above, the motor drive 108 includes the direct torque control component 109, which directly controls the torque applied to the rotor 104. Thus, the motor drive 108 can output current that is configured to cause the torque applied to the rotor 104 to correspond to the torque specified in the control signal.

As mentioned above, the emulator 100 can be caused to emulate a variety of different types of rotary energy generators. Accordingly, for example, the user can first cause the emulator to emulate a first type of rotary energy generator, and may subsequently cause the emulator 100 to emulate a second type of rotary energy generator. Therefore, for example, the user of the emulator 100 can first select a first type of rotary energy generator from the list of selectable rotary energy generators output by the computing apparatus 110, which can cause the emulator 100 to emulate the first type of rotary energy generator. Later, the user can select a second type of rotary energy generator from the list of selectable rotary energy generators output by the computing apparatus 110, which can cause the emulator 100 to emulate the second type of rotary energy generator.

Figure 2:
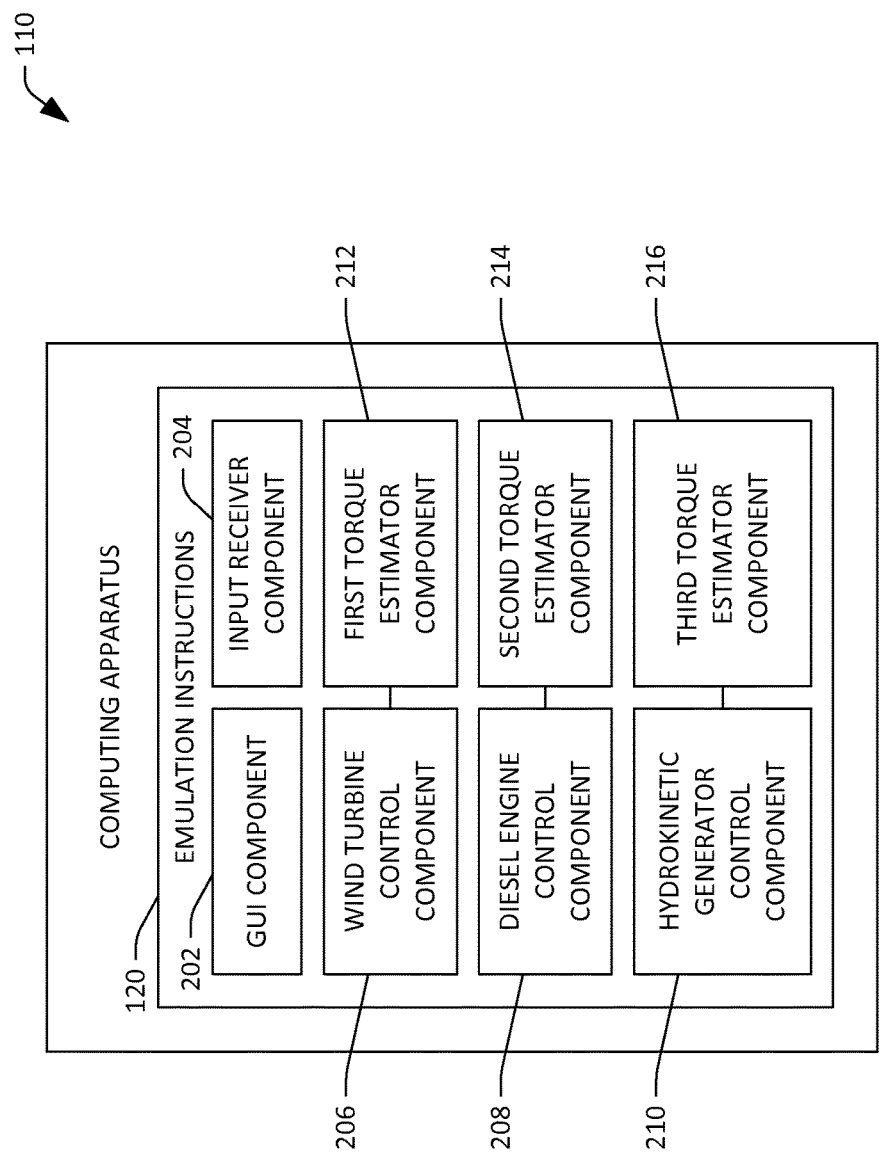
FIG. 2 is a functional block diagram of an exemplary computing apparatus that can be configured to output control signals to a motor drive that, in turn, causes an electromechanical motor-generator pair to emulate a rotary energy generator.

With reference now to FIG. 2, a functional block diagram of the computing apparatus 110 is illustrated. As indicated above, the computing apparatus 110 comprises the emulation instructions 120. The emulation instructions 120 can include a graphical user interface (GUI) component 202 that causes a GUI to be presented on a display screen associated with the computing apparatus 110. The GUI can include a list of selectable rotary energy generators that can be emulated by the emulator 100 when control components respectively corresponding to the selectable rotary energy generators are executed at the computing apparatus 110. In an exemplary embodiment, the list of selectable rotary energy generators may include at least one of the following: a wind turbine, a diesel engine, or a hydrokinetic generator. Exemplary hydrokinetic generators can include a wave energy converter (WEC), a river turbine, or the like.

The emulation instructions 120 can further include an input receiver component 204 that can receive a selection of one of the selectable rotary energy generators presented in the GUI. Additionally, the input receiver component 204 can receiving an input profile that describes stimuli to be applied to the selected rotary energy generator. For example, such input profile may include wind velocities and directions over time (e.g., if the user has selected a wind turbine), wave velocities and directions over time (e.g., if the user has selected a hydrokinetic generator), etc.

The emulation instructions 120 can further include control components for respective selectable rotary energy generators represented in the GUI. Accordingly, for example, the emulation instructions 120 can include a wind turbine control component 206, a diesel engine control component 208, and a hydrokinetic generator control component 210. When the computing apparatus 110 executes the wind turbine control component 206, the computing apparatus 110 outputs control signals to the motor drive 108 that cause the motor drive 108 to control the electromechanical motor 102 such that the emulator 100 emulates a wind turbine. Similarly, when the computing apparatus 110 executes the diesel engine control component 208, the computing apparatus 110 outputs control signals to the motor drive 108 that cause the motor drive 108 to control the electromechanical motor 102 such that the emulator 100 emulates a diesel engine. Likewise, when the computing apparatus 110 executes the hydrokinetic generator control component 210, the computing apparatus 110 outputs control signals to the motor drive 108 that cause the motor drive 108 to control the electromechanical motor 102 such that the emulator 100 emulates a hydrokinetic generator.

As will be described in greater detail below, the control components 206-210 can be based upon respective mathematical models of a wind turbine, a diesel engine, and a hydrokinetic generator. Exemplary mathematical models for such rotary energy devices are set forth herein. Furthermore, the control components 206-210 can output respective control signals based upon estimated electromagnetic torque produced by the generator 105. Accordingly, for example, the emulation instructions 120 can include a respective torque estimator component for each control component in the control components 206-210. Thus, the emulation instructions 120 include: a first torque estimator component 212 that provides the wind turbine control component 206 with estimated generator torque; a second torque estimator component 214 that provides the diesel engine control component 208 with estimated generator torque, and a third torque estimator component 216 that provides the hydrokinetic generator control component 210 with estimated generator torque.

Operation of the wind turbine control component 206 and the first torque estimator component 212 is now set forth. As noted above, the wind turbine control component 206 can be based upon a mathematical model of a wind turbine, wherein the wind turbine includes blades, a rotor, and a generator mechanically linked to the turbine. For a given wind speed $v_w$, the average mechanical power provided by a fixed-pitch wind turbine can be given as follows:

$$P_w(v_w, \omega_{rm}) = \frac{1}{2}\rho(\pi R_{turb}^2)C_p(\lambda)v_w^3, \quad (1)$$

where $\omega_{rm}$ is the mechanical rotor speed in radians/second, $R_{turb}$ is the radius of the turbine swept area in meters, p is the density of air in kg/m$^3$, $\lambda = R_{turb}\omega_{rm}/v_w$ is the tip speed ratio, and $C_p(\lambda)$ is the aerodynamic power coefficient of the wind turbine. An expression for the average rotor torque in Nm can be developed by dividing Eq. (1) by the rotor speed as follows:

$$T_{turbAve}(v_w, \omega_{rm}) = \frac{1}{2}\rho(\pi R_{turb}^2)C_p(\lambda)\frac{v_w^3}{\omega_{rm}}. \quad (2)$$

Further, it can be understood that torque harmonics may result due to effects of wind shear. Wind shear results from the difference in wind speed as a function of altitude. As wind speed tends to decrease with altitude, torque pulsations may occur as turbine blades passed through altitude extrema during rotation. The effective wind shear can be computed by accounting for the position of the aerodynamic center of each blade and computing the wind speed at that position. The height of the aerodynamic center of each blade above ground for a three-blade turbine can be given as follows:

$$h_i = H_{hub} c R_{turb} \sin\theta_i, \, i\{1, 2, 3\}, \quad (3)$$

where $H_{hub}$ is the height of the turbine hub, $C \in (0,1)$ is a scaling factor that determines the aerodynamic center of the blade from the hub, and $\theta_i$ values are 120° apart. The wind speed at the height of the aerodynamic center can then be computed as follows:

$$v_w(h_i) = v_w(H_{hub})\left(\frac{h_i}{H_{hub}}\right)^b, \quad (4)$$

where the wind shear exponent b can be empirically determined.

The turbine (rotor) torque can be calculated as the sum of the torques contributed by each blade. For a three-blade turbine, the rotor torque can be given as follows:

$$T_{turb}(v_w, \omega_{rm}) = \frac{1}{3}\sum_{i=1}^{3}T_{turbAve}(v_w(h_i), \omega_{rm}). \quad (5)$$

Given the rotor torque defined in Eq. (5), the rotor rotation can be modeled as follows:

$$\frac{d}{dt}\omega_{rm} = \frac{T_{turb}(v_w, \omega_{rm}) - T_{gen}}{J_{turb} + J_{gen}}, \quad (6)$$

where $J_{turb}$ and $J_{gen}$ are the moments of inertia in kg·m$^2$ for the rotor and generator, respectively, and $T_{gen}$ is electromagnetic torque produced by the generator of the wind turbine.

Dynamics of the emulator 100 when configured to emulate a wind turbine based upon the model set forth above is now described. The rotation of the electromechanical motor 102 and the generator 105 can be given as follows:

$$\frac{d}{dt}\omega_{rm} = \frac{T_{IM} - T_{gen}}{J_{IM} + J_{gen}}, \quad (7)$$

where $\omega_{rm}$ is the mechanical speed of the rotor 104 of the electromechanical motor 102 (e.g., which can be an induction motor), $T_{IM}$ is the torque at the rotor 104 of the motor 102, $T_{gen}$ is the generator torque, $J_{IM}$ is the moment of inertia of the rotor 104, and $J_{gen}$ is the moment of inertia of the generator 105. It can be noted that the moment of inertia for the electromechanical motor 102 is expected to be considerably lower than that of a wind turbine (e.g., $J_{IM} \ll J_{turb}$). In an exemplary embodiment, this can be addressed by adding a flywheel to an output shaft of the motor 102. This approach, however, does not allow for flexibility to emulate turbines of varied size. The emulator 100 can be configured to allow for a change in wind turbine emulation through software. Accordingly, the torque reference can be computed by equating Eq. (6) and Eq. (7). For example, it can be assumed that the terms $J_{IM}$, $J_{gen}$, and $J_{turb}$ are known and constant throughout an experiment, and speed of the rotor 104 can be continuously measured based upon output of the sensor 114 (e.g., by the computing apparatus 110 or the motor drive 108). To compute $T^*_{IM}$, however, the electromagnetic torque $T_{gen}$ produced by the generator 105 must be known or estimated. A commanded torque reference that can be output by the wind turbine control component 206 can thus be given as follows:

$$T_{IM}^* = \frac{J_{IM} + J_{gen}}{J_{turb} + J_{gen}} T_{turb}(v_w, \omega_{rm}) - \frac{J_{IM} - J_{turb}}{J_{turb} + J_{gen}} \hat{T}_{gen} \qquad (8)$$

where $\hat{T}_{gen}$ is an estimate of $T_{gen}$ and can be computed by the first torque estimator component 212.

Exemplary details pertaining to the first torque estimator component 212 are now provided. As mentioned above, it may be undesirable to employ a torque sensor to sense electromagnetic torque produced by the generator 105. Accordingly, the first torque estimator component 212 can estimate the generator torque, wherein the estimated generator torque is denoted as $\hat{T}_{gen}$. This value, as shown above, can be used to evaluate Eq. (8). For the purposes of the first torque estimator component 212, the model of the emulator 100 can be assumed to be that of Eq. (7) with $\dot{T}_{gen}=0$, except at points of step change. Given that $\omega_{rm}$ can be measured based upon output of the sensor 114 (which may be a speed encoder), and assuming that $T_{IM}=T^*_{IM}$ is known, dynamics that are applicable to the first torque estimator component 212 can be given as follows:

$$\frac{d}{dt}\begin{bmatrix} \hat{\omega}_{rm} \\ \hat{T}_{gen} \end{bmatrix} = \begin{bmatrix} 0 & -\frac{1}{J_{IM} + J_{Gen}} \\ 0 & 0 \end{bmatrix}\begin{bmatrix} \omega_{rm} \\ T_{gen} \end{bmatrix} + \qquad (9)$$

$$\begin{bmatrix} \frac{1}{J_{IM} + J_{Gen}} \\ 0 \end{bmatrix} T_{IM} + \begin{bmatrix} \kappa_\omega \\ \kappa_T \end{bmatrix}\Delta\omega_{rm}$$

where $\Delta\omega_{rm} = \omega_{rm} - \hat{\omega}_{rm}$ is the estimation error of the speed of the rotor 104. Likewise, the estimation error for the generator torque can be given by $\Delta T_{gen} = T_{gen} - \hat{T}_{gen}$. The error system for the first estimator component 212, in such case, in continuous time, can be given as follows:

$$\frac{d}{dt}\begin{bmatrix} \Delta\omega_{rm} \\ \Delta\hat{T}_{gen} \end{bmatrix} = \begin{bmatrix} \kappa_\omega & \frac{1}{J_{IM} + J_{Gen}} \\ \kappa_T & 0 \end{bmatrix}\begin{bmatrix} \Delta\omega_{rm} \\ \Delta T_L \end{bmatrix}. \qquad (10)$$

In order to improve the performance of the emulator 100, the effect on control caused by the first torque estimator component 212 is desirably marginalized. The terms $\kappa_m$ and $\kappa_T$ can be selected to replace the eigenvalues of Eq. (10), such that the response is "fast" compared to the inertia constant of the emulator hardware. In practice, however, the emulator 100 (and thus the first torque estimator component 212) must be realized in discrete-time.

Discrete time implementation of the emulator 100 when emulating a wind turbine is now set forth. The discrete time model can be generated by setting $\omega_{rm}(k) = \omega_{rm}(kt_s)$, $T_{turb}(k) = T_{turb}(kt_s), \ldots$, etc., where $t_s$ is a sampling time step. The torque at the rotor of the wind turbine and the torque at the rotor 104 of the electromechanical motor 102 can be calculated for the k+1$^{st}$ step as follows:

$$T_{turbAve}(k+1) = \frac{1}{2}\rho(\pi R_{turb}^2)C(\lambda(k))\frac{v_w^3(k+1)}{\omega_{rm}(k)}, \qquad (11)$$

$$T_{IM}^*(k+1) = \frac{J_{IM} + J_{gen}}{J_{turb} + J_{gen}} T_{turb}(k+1) - \frac{J_{IM} - J_{turb}}{J_{turb} + J_{gen}} \hat{T}_{gen}(k+1). \qquad (12)$$

To implement the first torque estimator component 212 in discrete-time, a two-step predictor-corrector estimator scheme can be developed. In the initial prediction step, estimates of the generator torque and speed of the rotor 104 can be obtained from the following inputs:

$$\begin{bmatrix} \overline{\omega}_{rm}(k+1) \\ \overline{T}_{gen}(k+1) \end{bmatrix} = \begin{bmatrix} \hat{\omega}_{rm}(k) \\ \hat{T}_{gen}(k) \end{bmatrix} + \qquad (13)$$

$$t_s\left(\begin{bmatrix} 0 & \frac{-1}{J_{IM} + J_{Gen}} \\ 0 & 0 \end{bmatrix}\begin{bmatrix} \hat{\omega}_{rm}(k) \\ \hat{T}_{gen}(k) \end{bmatrix} + \begin{bmatrix} \frac{1}{J_{IM} + J_{Gen}} \\ 0 \end{bmatrix}T_{IM}(k)\right).$$

In the corrector step, the values can be updated using a speed measurement:

$$\begin{bmatrix} \hat{\omega}_{rm}(k+1) \\ \hat{T}_{gen}(k+1) \end{bmatrix} = \begin{bmatrix} \overline{\omega}_{rm}(k+1) \\ \overline{T}_{gen}(k+1) \end{bmatrix} + \begin{bmatrix} \kappa_\omega & 0 \\ \kappa_T & 0 \end{bmatrix}\Delta\omega_{rm}(k+1). \qquad (14)$$

It can be noted that the estimate of the speed of the rotor 104 $\hat{\omega}_{rm}$ can be used only by the first torque estimator component 212, and is not used to evaluate Eq. (11).

Figure 3:
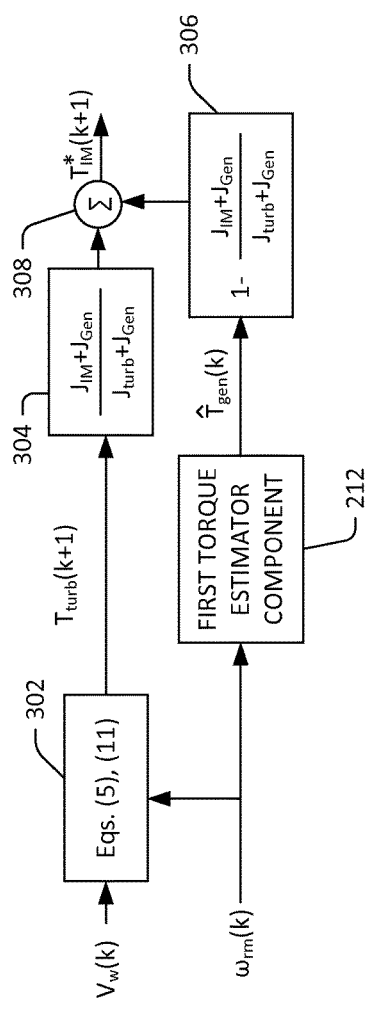
FIG. 3 is a functional block diagram that illustrates exemplary control logic that can be executed by a computing apparatus to cause an electromechanical motor-generator pair to emulate a wind turbine-driven generator.

Referring to FIG. 3, a functional block diagram that illustrates exemplary operations that can be undertaken by the wind turbine control component 206 and the first torque estimator component 212 is presented. The functional block diagram includes the first torque estimator component 212 and processing blocks 302, 304, 306, and 308, which can be comprised by the wind turbine control component 206. As indicated, the wind turbine control component 206 can receive a wind speed profile $v_w(k)$, and can further receive the measured speed $\omega_{rm}$ of the rotor 104 based upon the output of the sensor 114. The wind turbine control component 206 may then, in processing block 302, execute Eq. (5) and (11), with Equations $v_w(k)$ and $\omega_{rm}$ as input. Additionally, the first torque estimator component 212 can receive $\omega_{rm}$, and can output an estimate of the electromagnetic torque produced by the generator 105 based upon $\omega_{rm}$.

The output of processing block 302 $T_{turb}(k+1)$ is fed into processing block 304, and the output of the torque estimator component 212 $\hat{T}_{gen}$ is fed into processing block 306. The output of the processing block 304 and the output of the processing block 306 is summed at processing block 308, and the output from the processing block 308 is a discrete commanded electromagnetic torque for a next discrete time set $(T^*_{IM}(k+1))$. This value can be provided to the direct torque control component 109 of the motor drive 108, which then controls operation of the electromechanical motor 102.

Returning to FIG. 2, operation of the diesel engine control component 208 and the second torque estimator component 214 is described in greater detail. As indicated above, the diesel engine control component 208 can output control signals that cause the emulator 100 to emulate a diesel engine-driven generator based upon a mathematical model of the diesel engine. Below, an exemplary mathematical model of a diesel engine is presented. It can be ascertained that since the electromechanical motor 102 and the diesel engine being emulated will have different moments of inertia and damping coefficients, it may be desirable to "match" their dynamics through adjustments made to the torque reference of the electromechanical motor 102. The second torque estimator component 214 facilitates such requirement.

A combustion engine converts chemical energy from hydrocarbon fuel (at some rate) to produce mechanical power. For diesel fuel, the combustion power $P_{fuel}$ is given in watts (W) by the following algorithm:

$$P_{fuel} = \frac{35.86 \cdot 10^6 J}{\text{Liter}} \cdot \dot{V}_{fuel}, \quad (15)$$

where $\dot{V}_{fuel}$ (liters/sec) is the rate of fuel delivered to the combustion engine. Furthermore, the conversion from combustion power to diesel engine mechanical power can be modeled as follows:

$$P_{de} = \frac{\eta_{de}}{\tau_{de}s + 1} P_{fuel}, \quad (16)$$

where $\eta_{de} \in (0,1)$ (unit-less) is the efficiency in converting chemical energy of the fuel into mechanical energy, $\tau_{de}$ (sec) is the time-constant due to injection and combustion delay, and $P_{de}$ (W) is the mechanical power ultimately delivered by the combustion process. From this, the diesel engine torque $T_{de}$ can given as follows:

$$T_{de} = \frac{P_{de}}{\omega_{rm} + \varepsilon}, \quad (17)$$

where $\omega_{rm}$ (radians/sec) is the mechanical rotor speed of the diesel engine, and $\varepsilon$ is a relatively small quantity used to avoid a divide by zero. The electromechanical motor 102 (and coupler), as noted above, can have a fixed moment of inertia $J_{im}$; likewise, the generator 105 has the fixed moment of inertia $J_{gen}$. The rotational dynamics of the emulator 100 can be given as follows:

$$\frac{d}{dt}\omega_{rm} = \frac{T_{im} - T_{gen} - B_{em}\omega_{rm}}{J_{im} + J_{gen}}, \quad (18)$$

where $B_{em}$ is the combined damping coefficient of the emulator 100 as a whole, and $T_{im}$, $T_{gen}$, and $\omega_{rm}$ are as described above.

Different engines may have different values for their respective inertia $J_{de}$ and damping coefficient $B_{de}$. In the circumstance that $J_{de} = J_{im}$ and $B_{de} = B_{em}$, the commanded electromagnetic torque $T^*_{im}$ sent to the motor drive 108 can be given directly by Eq. (17) ($T^*_{im} = T_{de}$). In order to emulate a diesel engine with $J_{de} \neq J_{im}$ and $B_{de} \neq B_{em}$, however, the electromagnetic torque command $T^*_{im}$ must be adjusted, such that the rotational dynamics of the emulator 100 match that of the diesel engine. Thus, the relationship given in Eq. (19) must be satisfied:

$$\frac{d}{dt}\omega_{rm} = \frac{T_{im} - T_{gen} - B_{em}\omega_{rm}}{J_{im} + J_{gen}} = \frac{T_{de} - T_{gen} - B_{de}\omega_{rm}}{J_{de} + J_{gen}}. \quad (19)$$

In the approach described herein, the velocity of the rotor 104 $\omega_{rm}$ is measured, and the torque $T_{im}$ is assumed to track the commanded value $T^*_{im}$. In an exemplary embodiment, the generator torque ($T_{gen}$) is not measured and, therefore, must be estimated.

Accordingly, the second torque estimator component 214 can be configured to compute an estimate of the generator torque $\hat{T}_{gen}$ when the emulator 100 is configured to emulate the diesel engine. With more particularity, the estimated generator torque $\hat{T}_{gen}$ may be developed by either measuring the speed of the rotor 104 and the electrical power output by the generator 105, or through the second torque estimator component 214, which updates an estimated value $\hat{T}_{gen}$ based on the error $\Delta\omega_{rm} = (\hat{\omega}_{rm} - \omega_{rm})$. Assuming $T_{gen}$ is piecewise constant (e.g. $\dot{T}_{gen} = 0$ except at points of step change), dynamics associated with the second torque estimator component 214 are as follows:

$$\frac{d}{dt}\begin{bmatrix}\hat{\omega}_{rm}\\ \hat{T}_{gen}\end{bmatrix} = \begin{bmatrix}\frac{-B_{em}}{J_{im}+J_{gen}} & \frac{-1}{J_{im}+J_{gen}}\\ 0 & 0\end{bmatrix}\begin{bmatrix}\hat{\omega}_{rm}\\ \hat{T}_{gen}\end{bmatrix} + \begin{bmatrix}\frac{1}{J_{im}+J_{gen}}\\ 0\end{bmatrix}T_{im} + \begin{bmatrix}\kappa_\omega\\ \kappa_T\end{bmatrix}\Delta\omega_{rm} \quad (20)$$

where $\Delta T_{gen} = \hat{T}_{gen} - T_{gen}$ and $\kappa_T$ and $\kappa_\omega$ are gains of the second torque estimator component 214. The resulting error system for the second torque estimator component 214 thus can be as follows:

$$\frac{d}{dt}\begin{bmatrix}\Delta\omega_{rm}\\ \Delta T_{gen}\end{bmatrix} = \begin{bmatrix}\kappa_\omega - \frac{B_{em}}{J_{im}+J_{gen}} & \frac{-1}{J_{im}+J_{gen}}\\ \kappa_T & 0\end{bmatrix}\begin{bmatrix}\Delta\omega_{rm}\\ \Delta T_{gen}\end{bmatrix} \quad (21)$$

To marginalize the effect of the second torque estimator component 214 on the closed loop dynamics of the emulator 100, the terms $\kappa_\omega$ and $\kappa_T$ are selected to place the eigenvalues of Eq. (21), such that the response is "fast" compared to the inertia constant of the hardware of the emulator 100. It is noted that for the system in Eq. (21), the eigenvalues may be placed at $\lambda_1$ and $\lambda_2$ by selecting $\kappa_\omega$ and $\kappa_T$ according to the following:

$$\kappa_\omega = \lambda_1 + \lambda_2 + \frac{B_{em}}{J_{im}+J_{gen}}; \text{ and} \quad (22)$$

$$\kappa_T = \lambda_1\lambda_2(J_{im}\ J_{gen}). \quad (23)$$

With $\hat{T}_{gen}$ established, the commanded electromagnetic torque to be provided to the motor drive 108 can be computed as follows:

$$T^*_{im} = \frac{J_{im}+J_{gen}}{J_{de}+J_{gen}}(T_{de}\ \hat{T}_{gen} - B_{de}\omega_{rm}) + \hat{T}_{gen} + B_{em}\omega_{rm}. \quad (24)$$

In practice, the engine model described above and the second torque estimator component 214 can be implemented using discrete time equivalents of Eq. (16), Eq. (17), Eq. (20), and Eq. (24). For a sampling time step of $t_s$, the discrete time model can be generated by setting $\omega_{rm}(k) = \omega_{rm}(kt_s)$, $T_{im}(k) = T_{im}(kt_s)$, . . . , etc. The discrete-time energy conversion and equations utilized by the second torque estimator component 214 can be given as follows:

$$P_{de}(k+1) = P_{de}(k) + \frac{t_s}{\tau_{de}}(\eta_{de}P_{fuel}(k+1) - P_{de}(k)), \quad (25)$$

$$\begin{bmatrix} \hat{\omega}_{rm}(k+1) \\ \hat{T}_{gen}(k+1) \end{bmatrix} = t_s \begin{bmatrix} \frac{-B_{em}}{J_{im}+J_{gen}} & \frac{-1}{J_{im}+J_{gen}} \\ 0 & 0 \end{bmatrix} \begin{bmatrix} \hat{\omega}_{rm}(k) \\ \hat{T}_{gen}(k) \end{bmatrix} + \quad (26)$$

$$t_s \begin{bmatrix} \frac{1}{J_{im}+J_{gen}} \\ 0 \end{bmatrix} T_{im}(k) + t_s \begin{bmatrix} K_\omega \\ K_T \end{bmatrix} \Delta\omega_{rm}(k)$$

To regulate engine speed about some reference, the diesel engine control component 208 can use a relatively simple proportional plus integral (PI) control as follows:

$$\dot{V}_{fuel} = \frac{\text{Liter}}{35.86 \cdot 10^6 J}\left(K_p \frac{K_i}{s}\right)(\omega_{rm}^* + \omega_{rm}), \quad (27)$$

where $\omega^*_{rm}$ is the speed reference and s is the Laplace variable. As with the second torque estimator component 214, the PI control is implemented in discrete-time given by the following equations:

$$\alpha(k+1) = \alpha(k)t_s + (\omega^*_{rm}(k)\omega_{rm}-(k)), \quad (28)$$

$$P_{fuel}(k+1) = K_p(\omega^*_{rm}(k)\omega_{rm}(k)) - K_i\alpha(k), \quad (29)$$

where the additional term $\alpha$ is the integral part of the speed error, and it is noted that for simplicity, the term $P_{fuel}$ can be computed directly.

Figure 4:
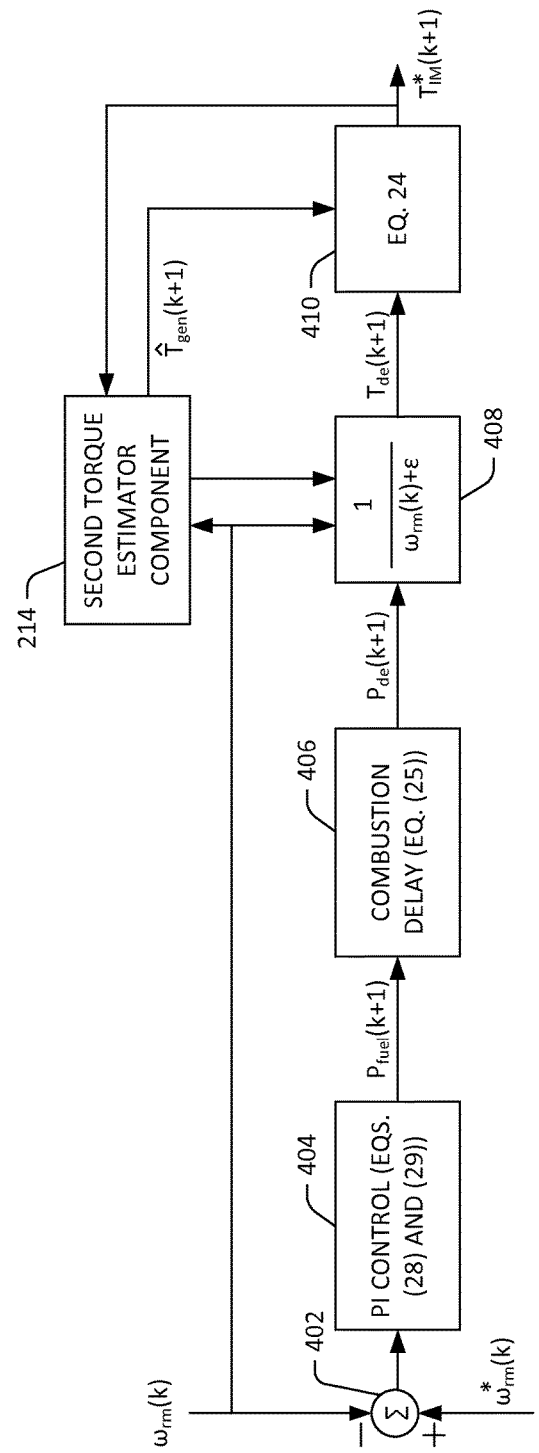
FIG. 4 is a functional block diagram that illustrates exemplary control logic that can be executed by a computing apparatus to cause an electromechanical motor-generator pair to emulate a diesel engine-driven generator.

Referring to FIG. 4, a functional block diagram that illustrates exemplary operations that can be undertaken by the diesel engine control component 208 and the second torque estimator component 214 is presented. The functional block diagram includes the second torque estimator component 214 and processing blocks 402, 404, 406, 408, and 410, which can be comprised by the diesel engine control component 208.

The diesel engine control component 208 can receive the measured speed of the rotor 104 (e.g., directly from the sensor 114, from the motor drive 108, etc.). At processing block 402, a difference between the measured rotor speed $\omega_{rm}(k)$ and commanded rotor speed $\omega^*_{rm}(k)$ is determined. At processing block 404, the PI control equations (Eq. (28) and Eq. (29)) are executed based upon the output of the processing block 402, thus generating $P_{fuel}(k+1)$. Processing block 406 (which executes Eq. (25)) receives the output of the processing block 404, and computes a combustion delay $P_{de}(k+1)$.

The algorithm shown in the processing block 408 is executed based upon estimated generator torque output by the second torque estimator component 214, producing $T_{de}(k+1)$. The torque estimator component 212 outputs $\hat{T}_{gen}(k+1)$ based upon $\omega_{rm}(k)$ and $T^*_{IM}(k+1)$, which is output by processing block 410. Processing block 410 can output $T^*_{IM}(k+1)$ to the motor drive 108.

Returning again to FIG. 2, the hydrokinetic control component 210 and the third torque estimator component 216 are described in greater detail. Dynamic models upon which the hydrokinetic control component 210 can be based are now set forth. Specifically, dynamic models of two very different hydrokinetic generators are set forth, and a respective model is presented for each. First, a river turbine model is discussed. For a river turbine, the mechanical power delivered to the rotor can be given as follows:

$$P_{turb} = \frac{1}{2}C_p(\lambda)\rho_w A_r v_w^3, \quad (30)$$

where $C_p(\lambda)$ is the power coefficient, $\rho_w$ is the density of water, $A_r$ is the cross-sectional area of the rotor of the river turbine, $v_w$ is the velocity of the water current, and $\lambda$ is the ratio of the water velocity and the velocity of the rotor tip speed, $\Delta=(R_{turb}\omega_{turb})/V_w$, where $R_{turb}$ is the rotor radius in meters. Thus, for a mechanical rotor speed of $\omega_{turb}$, the mechanical torque delivered to the rotor by the water flow is given as follows:

$$T_{turb} = \frac{P_{turb}}{\omega_{turb}} = \frac{1}{2\omega_{turb}}C_p(\lambda)\rho_w A_r v_w^3. \quad (31)$$

The dynamic response of the turbine will depend on the torque delivered by the cross flow of water (Eq. (31)), as well as the torque of the power takeoff generator, the shaft and gearbox losses, and the system inertia. The turbine velocity dynamic can be modeled as the following:

$$\frac{d\omega_{turb}}{dt} = \frac{T_{turb} - N_{gb}T_{pto} - B_{gb}\omega_{turb}}{J_{turb} + N_{gb}^2 J_{pto}}, \quad (32)$$

where $N_{gb}$ is the gearbox ratio such that $\omega_{pto}=N_{gb}\omega_{turb}$, $\omega_{pto}$ is the rotational speed of the power takeoff generator, $T_{pto}$ is the power takeoff generator torque, $B_{gb}$ is the damping coefficient of the gearbox, and $J_{turb}$ and $J_{pto}$ are the moments of inertia of the turbine and power takeoff generator, respectively. As will be discussed below, it is convenient to represent the dynamics in terms of the power takeoff generator rotation rather than turbine rotation. By substituting $\omega_{pto}=N_{gb}\omega_{turb}$ into Eq. (32), the generator dynamic equation may be written as follows:

$$\frac{d\omega_{pto}}{dt} = \frac{\frac{1}{N_{gb}}T_{turb} - T_{pto} - \left(\frac{1}{N_{gb}^2}\right)B_{gb}\omega_{pto}}{(1/N_{gb}^2)J_{turb} + J_{pto}}. \quad (33)$$

In another embodiment, the hydrokinetic control component 210 can be based upon a model for a point absorber. An exemplary model for a point absorber is now set forth. For a monochromatic wave, the wave power can be given as follows:

$$P_{wave} = \frac{\rho_{sw}g^2 H^2 T}{32\pi}CW, \quad (34)$$

where $\rho_{sw}$ is the density of seawater, g is the gravitational constant, H is the wave height (m), T is the wave period (sec), and CW is the WECs capture width (m). In the description herein, the focus is on the single-body point absorber which extracts power from waves using a single mass that moves with changes in sea water level. It is to be understood that control components for other types of WECs are also contemplated.

The single-body point absorber equation of motion with power takeoff is based on Cummins' time domain impulse response model for ship motions, and can be given as follows:

$$F_e(t) - F_r(t) - F_m(x,\dot{x}) = K_{hs}x \; B_{pto}\dot{x} + (m + A(\infty))\ddot{x}, \quad (35)$$

where $F_e(t)$ is the excitation force given as follows:

$$F_e(t) = \int_{-\infty}^{\infty} \eta(\tau) f_e(t-\tau) d\tau, \quad (36)$$

$F_r(t)$ is the radiation force given as follows:

$$F_r(t) = \int_{-\infty}^{\infty} \dot{x} f_r(t-\tau) d\tau, \quad (37)$$

$F_m$ is the mooring force given as follows:

$$F_m(t) = 8k_m\left(1 - \frac{l_m}{(l_m^2 + x^2)^{1/2}}\right)x, \quad (38)$$

$K_{hs}$ is a hydrostatic force constant given as follows:

$$K_{hs} = \rho_{sw} g A, \quad (39)$$

and where $\eta(\tau)$ is the wave height in meters, $B_{pto}$ is a viscous damping term associated with the power take off resulting in a mechanical power take off of $P_{pto} = B_{pto}\dot{x}^2$ in Watts, m is the mass of the buoy, and $A(\infty)$ is the equivalent added mass sea water.

It can be noted that Eq. (35) resembles a classic mass-damper system except that the force calculations are considerably more complex. Eqs. (36) and (37) are based on computation of an impulse response function. In particular, Eq. (36) is non-causal; that is, the computation requires information about future values of wave height $\eta(\tau)$.

The dynamic equation for the emulator 100 has been set forth in Eq. (18). The base speed and power ratings may be available as nameplate values for hardware in the emulator 100. The emulator, inertia, and damping coefficients can be determined from experiment. For example, the electromechanical motor torque can be stepped and the inertia and damping coefficient can be determined from the rise time and steady-state value of the rotor speed. Finally, a scale factor $k_{sc}$ can be included as the ratio of the base power of the emulator 100 to the physical system being emulated. The scale factor $k_{sc}$ can scale the inertia, damping coefficient, and turbine torque equally, thus preserving the time constant of the initial system.

Again, the third torque estimator component 216 can desirably estimate the generator torque. The emulator rotor speed $\omega_{rm}$ can be measured using a speed encoder, and the induction motor torque $T_{IM}$ can be commanded by the control, but the generator torque, in an exemplary embodiment, is not measured. As will be shown, a value for the generator torque may be necessary for proper operation of the emulator 100. Thus, the third torque estimator component 216 can be developed. Approximating $T_{gen}$ as constant $$\left(\frac{d}{dt}T_{gen} = 0\right),$$

dynamics associated with the third torque estimator component 216 can be given as follows:

$$\frac{d}{dt}\begin{pmatrix}\hat{\omega}_{rm}\\\hat{T}_{gen}\end{pmatrix} = \begin{pmatrix}\frac{-B_{em}}{J_{em}} & \frac{-1}{J_{em}} \\ 0 & 0\end{pmatrix}\begin{pmatrix}\hat{\omega}_{rm}\\\hat{T}_{gen}\end{pmatrix} + \begin{pmatrix}\frac{1}{J_{em}}\\0\end{pmatrix}T_{IM} + \begin{pmatrix}\kappa_\omega\\\kappa_T\end{pmatrix}\Delta\omega_{rm}, \quad (40)$$

where $\hat{T}_{gen}$ and $\hat{\omega}_{rm}$ are estimated quantities, $\Delta\omega_{rm} = (\hat{\omega}_{rm} - \omega_{rm})$ is the speed error, and $\kappa_\omega$ and $\kappa_T$ are estimator gains.

Control that can be effectuated by the hyperkinetic generator control component 210 for both a river turbine and a point absorber emulator are set forth. In connection with emulating the river turbine dynamics, the following equations can be established:

$$\omega_{rm} = \left(\frac{n_{em}}{n_{pto}}\right)\omega_{pto}, \text{ and} \quad (41)$$

$$T_{gen} = \left(\frac{n_{pto}}{n_{em}}\right)T_{pto}, \quad (42)$$

where $n_{pto}$ is the base speed of the power take off generator on the physical river turbine and $n_{em}$ is a nominal emulator generator speed computed using the maximum desired emulator speed, maximum flow rate (computed from Eq. (30) and rated power), turbine radius and the optimal tip speed ratio as shown in Eq. (43) below:

$$n_{em} = \frac{n_{pto} R_{turb} \max(\omega_{rm})}{n_{gb}\lambda * \max(v_w)}. \quad (43)$$

Eq. (33), Eq. (39), Eq. (41), and Eq. (43) can be combined, and the following can be computed for the commanded induction motor torque:

$$T_{im}^* = \left(\frac{n_{em}}{n_{pto}} \cdot \frac{(1/N_{gb})J_{em}}{(1/N_{gb}^2)J_{turb} + J_{pto}}\right)T_{turb} + \\ \left(1 - \left(\frac{n_{em}}{n_{pto}}\right)^2 \frac{J_{em}}{k_{sc}((1/N_{gb}^2)J_{turb} + J_{pto})}\right)T_{gen} + \\ \left(B_{em} - \frac{(1/N_{gb}^2)B_{gb}J_{em}}{(1/N_{gb}^2)J_{turb} + J_{pto}}\right)\omega_{rm}. \quad (44)$$

For the emulator 100, a discrete time version of Eq. (44), with predefined parameter values, can be developed and used directly to compute turbine power, and thus turbine torque, in an exemplary river turbine.

For the point absorber, the emulator can use a more sophisticated model of a single mass system with power takeoff. In each, the generator 105 can be a three-phase permanent magnet generator.

The hydrokinetic generator control component 210, when used to cause the emulator 100 to emulate a point absorber, is now set forth. Identifying the velocity and acceleration of the mass as $$v_m = \dot{x} \text{ and } \frac{d}{dt}v_m = \ddot{x},$$

the second-order dynamics may be written as follows:

$$\frac{d}{dt}v_m = \frac{1}{m + A(\infty)}(-B_{pto}v_m - K_{hs}x + F_e - F_r - F_m), \quad (45)$$

$$\frac{d}{dt}x = v_m. \quad (46)$$

Discrete time equivalents can be developed for Eq. (45) and Eq. (46), and the buoy velocity $v_m$ and position x can be solved using trapezoidal integration. Although the buoy exhibits linear oscillatory behavior, the power takeoff can be realized using rotational generation. In an exemplary embodiment, an idealized model can be considered that preserves the power balance $B_{pto}V_m^2 = T_{IM}\omega_{rm}$. Specifically, the emulator induction motor torque command that can be used is as follows:

$$T_{IM}^* = k_{sc}\frac{B_{pto}v_m^2}{\omega_{rm} + \epsilon}, \quad (47)$$

where $\epsilon$ is a small value included to avoid a divide by zero and $k_{sc}$ is again used to scale down power levels. The point absorber x position and velocity can be tracked numerically and the output power realized using Eq. (47). It can be noted from Eq. (47) that the torque is always positive and that the generator 105 will rotate in one direction.

Although the computing apparatus 110 is shown as including the torque estimator components 212-216, it is to be appreciated that a torque sensor can be employed to directly measure the generator torque. Thus, embodiments where the emulator 100 includes a torque sensor are also contemplated, wherein the estimated generator torque used by the control components 206-210 is replaced by measured generator torque from a torque sensor.

Figure 5:
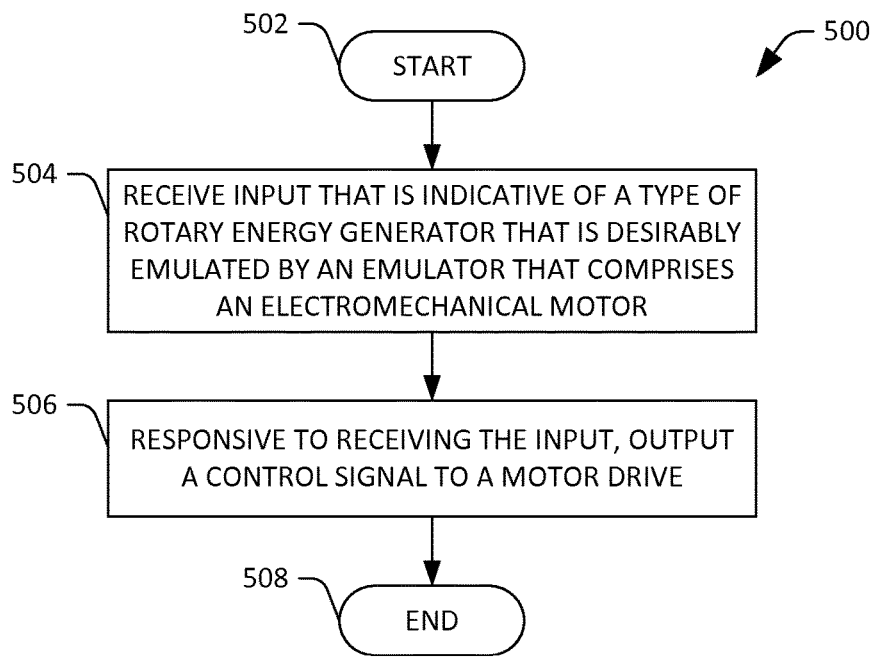
FIG. 5 is a flow diagram illustrating an exemplary methodology for outputting a control signal to a motor drive, wherein the control signal causes the motor drive to control an electromechanical motor, such that the electromechanical motor (and a generator coupled thereto) emulates a rotary energy generator.
Figure 6:
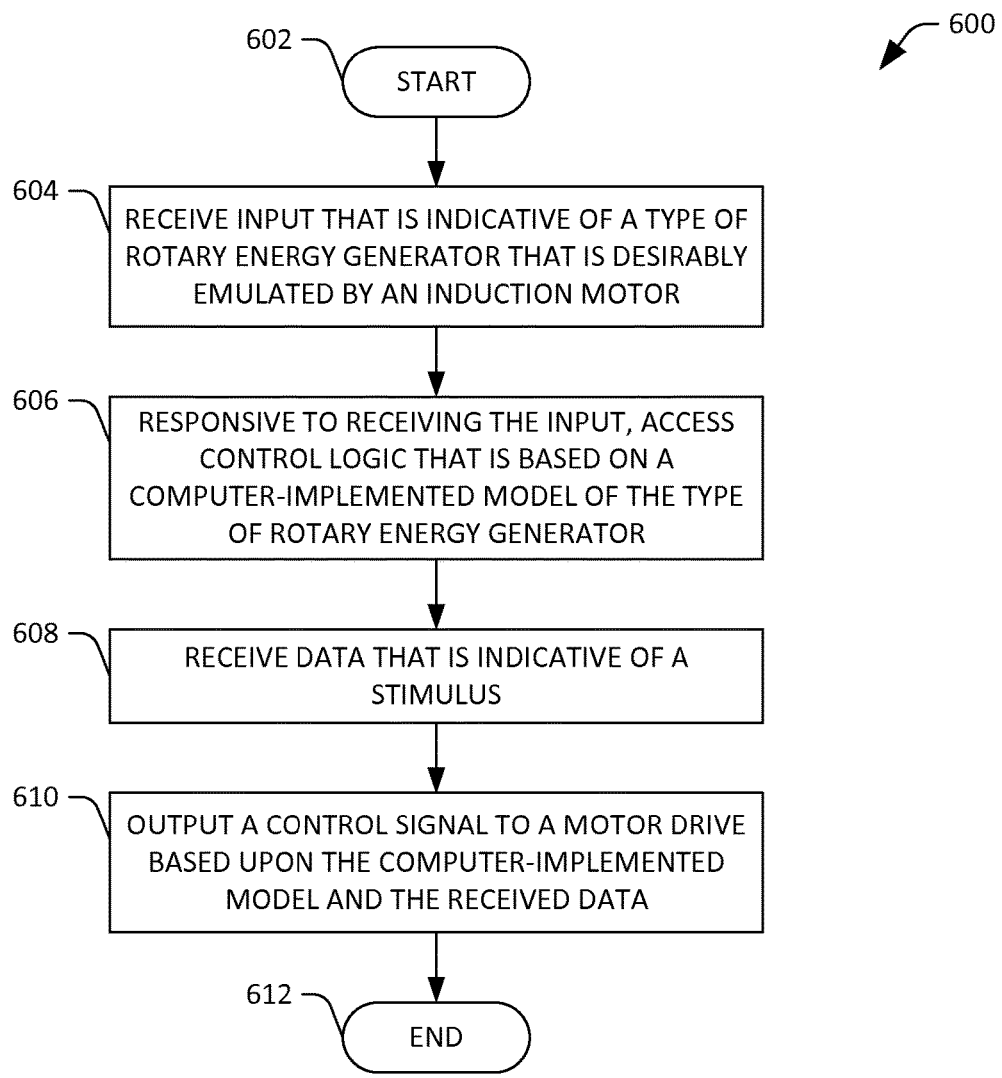
FIG. 6 is a flow diagram illustrating an exemplary methodology for outputting a control signal to a motor drive based upon a mathematical model of a rotary energy generator.

FIGS. 5-6 illustrate exemplary methodologies relating to emulation of rotary energy sources. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 5, an exemplary methodology 500 that facilitates emulating at least one of a diesel engine, a wind turbine, or a hydrokinetic energy source is illustrated. The methodology 500 starts at 502, and at 504, input is received that is indicative of a type of rotary energy generator that is desirably emulated by an emulator, wherein the emulator comprises an electromechanical motor. The type of rotary energy generator is one of a diesel engine-generator, a wind turbine, or a hydrokinetic generator.

At 506, responsive to receiving the input, a control signal is output to a motor drive, wherein the motor drive, responsive to receiving the control signal, is configured to control speed and torque of a rotor of an electromechanical motor to emulate operation of one of the diesel engine, the wind turbine, or the hydrokinetic generator. The methodology 500 completes at 508.

Now referring to FIG. 6, an exemplary methodology 600 that facilitates controlling an electromechanical motor in connection with emulating a rotary energy source is illustrated. The methodology 600 starts at 602, and at 604, input that is indicative of a type of rotary energy generator that it is to be desirably emulated by an induction motor is received, wherein the type is one of a plurality of selectable types of rotary generator types.

At 606, responsive to receiving the input, control logic that is based upon a computer-implemented model of the selected type of rotary energy generator is accessed. The computer implemented model can define a rotary response of a rotor of the rotary energy generator responsive to a stimulus.

At 608, data is received that is indicative of based stimulus (e.g., a wind profile), and at 610 a control signal is output to a motor drive based upon the data received at 608 and the control logic accessed at 606. It is to be understood that the control signal can cause the motor drive to control operation of an induction motor, such that a speed of the rotor of the induction motor and the torque at the rotor conforms to the computer-implemented model. The methodology 600 completes at 612.

Figure 7:
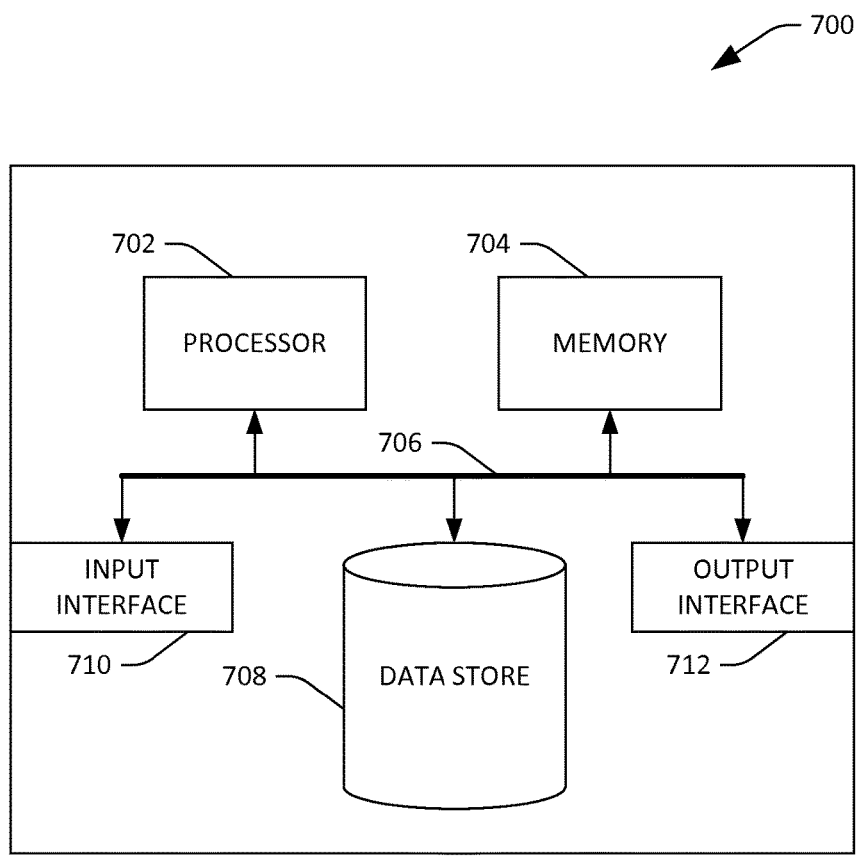
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that supports emulation of a wind turbine. By way of another example, the computing device 700 can be used in a system that supports emulation of a diesel engine, a hydrokinetic generator, etc. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706.

The computing device 700 additionally includes a data store 708 that is accessible by the processor 702 by way of the system bus 706. The data store 708 may include executable instructions, control logic, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
an emulator comprising:
an electromechanical motor that comprises a rotor;
a motor drive electrically coupled to the electromechanical motor, the motor drive configured to control speed and torque of the rotor; and
a computing apparatus electrically coupled to the motor drive, the computing apparatus configured with computer-executable instructions that cause the computing apparatus to output a signal to the motor drive, the signal causing the motor drive to control the speed and torque of the rotor in connection with an emulated rotary energy source emulated by the emulator, the emulated rotary energy source selected from a group consisting of a diesel engine and a hydrokinetic generator;
wherein the computer-executable instructions comprise:
receiving an input that is indicative of the emulated rotary energy source; and
responsive to receiving the input, outputting a control signal to the motor drive, wherein the motor drive, responsive to receiving the control signal controls speed and torque of the rotor of the electromechanical motor;
wherein the computing apparatus comprises computer-executable instructions for emulating both the diesel engine and the hydrokinetic generator; and
wherein the computer-executable instructions comprise an electromagnetic torque for the diesel engine determined by the equation:

$$T^*_{im} = \frac{J_{im} + J_{gen}}{J_{de} + J_{gen}}(T_{de} - \hat{T}_{gen} - B_{de}\omega_{rm}) + \hat{T}_{gen} + B_{em}\omega_{rm}$$

and
an induction motor torque for the hydrokinetic generator determined by the equation:

$$T^*_{IM} = k_{sc}\frac{B_{pto}v_m^2}{\omega_{rm} + \epsilon};$$

where $T^*_{IM}$ is the torque at the rotor of the electromechanical motor, $J_{im}$ is a fixed moment of inertia for the electromechanical motor, $J_{gen}$ is a fixed moment of inertial for a generator, $B_{em}$ is the combined damping coefficient of the emulator, damping coefficient $B_{de}$ is a damping coefficient, $J_{de}$ is inertia, $k_{sc}$ is a scale factor, $\epsilon$ is a small value included to avoid a divide by zero, $v_m$ is a buoy velocity, $B_{pto}$ is the damping coefficient of a power take off, $T_{de}$ is diesel engine torque, $\hat{T}_{gen}$ is generator torque, and $\omega_{rm}$ is the mechanical rotor speed in radians/second.

2. The system of claim 1, the computer-executable instructions comprising first instructions and second instructions, the first instructions, when executed by the computing apparatus, cause the computing apparatus to output a first signal to the motor drive that causes the motor drive to control the speed and torque of the rotor in connection with emulating the diesel engine, and the second instructions, when executed by the computing apparatus, cause the computing apparatus to output a second signal to the motor drive that causes the motor drive to control the speed and torque of the rotor in connection with emulating the hydrokinetic generator.

3. The system of claim 2, one of the first instructions or the second instructions executed by the computing apparatus responsive to receipt of user input.

4. The system of claim 1, further comprising a sensor that senses at least one operating parameter of the electromechanical motor, the computing apparatus receives output from the sensor and computes an estimate of torque produced by a generator that is coupled to the electromechanical motor, the estimate of the torque computed based upon the output from the sensor, the computing apparatus outputs the signal based upon the estimate of the torque.

5. The system of claim 4, the sensor being other than a torque sensor.

6. The system of claim 4, the sensor being a rotational velocity encoder that outputs a signal that is indicative of rotational velocity of the rotor.

7. The system of claim 1, the electromechanical motor being an induction motor.

8. The system of claim 1, the computing apparatus configured to receive input pertaining to at least one simulated environmental condition, the computing apparatus outputs the signal based upon the input.

9. The system of claim 1, wherein the computing apparatus is configured to receive data that defines size parameters of the emulated rotary energy source, the computing apparatus outputting the signal to the motor drive based upon the data that defines the size parameters of the emulated rotary energy source.

10. The system of claim 1, the motor drive configured to directly control the torque based upon the signal output by the computing apparatus.

11. The system of claim 1, further comprising
a second electromechanical motor that comprises a second rotor;
a second motor drive electrically coupled to the second electromechanical motor, the second motor drive configured to control speed and torque of the second rotor; and
a second computing apparatus electrically coupled to the motor drive, the second computing apparatus configured with computer-executable instructions that cause the second computing apparatus to output a second signal to the second motor drive, the second signal causes the second motor drive to control speed and torque of the second rotor in connection with emulating a second emulated rotary energy generator different than the emulated rotary energy generator.

12. The system of claim 11, wherein the second computing apparatus is configured to receive data that defines size parameters of a wind turbine, the computing apparatus outputting the signal to the motor drive based upon the data that defines the size parameters of the wind turbine.

13. The system of claim 11, wherein the first and second computing apparatus are the same.

14. A method, comprising:
receiving input that is indicative of a type of rotary energy generator that is emulated by an emulator, the emulator comprising an electromechanical motor and a generator coupled to the electromechanical motor,
wherein the emulator is capable of emulating at least two types of rotary energy generators selected from a group consisting of a diesel engine, a wind turbine, and a hydrokinetic generator; and
responsive to receiving the input, outputting a control signal to a motor drive, wherein the motor drive, responsive to receiving the control signal, is configured to control speed and torque of a rotor of the electromechanical motor such that the emulator emulates the selected rotary energy generator; and
wherein the computer-executable instructions comprise an electromagnetic torque for the diesel engine determined by the equation:

$$T_{im}^* = \frac{J_{im} + J_{gen}}{J_{de} + J_{gen}}(T_{de} - \hat{T}_{gen} - B_{de}\omega_{rm}) + \hat{T}_{gen} + B_{em}\omega_{rm}$$

and
an induction motor torque for the hydrokinetic generator determined by the equation:

$$T_{IM}^* = k_{sc}\frac{B_{pto}v_m^2}{\omega_{rm} + \epsilon};$$

where $T^*_{IM}$ is the torque at the rotor of the electromechanical motor, $J_{im}$ is a fixed moment of inertia for the electromechanical motor, $J_{gen}$ is a fixed moment of inertial for a generator, $B_{em}$ is the combined damping coefficient of the emulator, damping coefficient $B_{de}$ is a damping coefficient, $J_{de}$ is inertia, $k_{sc}$ is a scale factor, $\epsilon$ is a small value included to avoid a divide by zero, $v_m$ is a buoy velocity, $B_{pto}$ is the damping coefficient of a power take off, $T_{de}$ is diesel engine torque, $\hat{T}_{gen}$ is generator torque, and $\omega_{rm}$ is the mechanical rotor speed in radians/second.

15. The method of claim 14, further comprising:
receiving data that is indicative of rotational velocity of the rotor of the motor;
estimating torque produced by the generator based upon the data that is indicative of the rotational velocity of the rotor; and
outputting the control signal based upon the estimating of the torque produced by the generator.

16. The method of claim 15, wherein the estimating of the torque is performed without receipt of a signal from a torque sensor.

17. The method of claim 14, further comprising:
receiving input that is indicative of at least one simulated environmental condition; and
outputting the control signal based upon the input.

18. The method of claim 14 executed by a computing apparatus that is electrically connected to the motor drive.

19. The method of claim 14, the electromechanical motor being an induction motor.

20. The method of claim 14, further comprising:
responsive to receiving the input, accessing a computer-readable storage medium that comprises control instructions for the type of rotary energy generator, the control instructions based upon a computer-implemented model of the type of rotary energy generator, the computer-implemented model defines responses of the rotary energy generator of the type to a stimulus, wherein the control signal causes the motor drive to control the speed and torque of the rotor based upon the computer-implemented model of the type of the rotary energy generator.

21. A computer-readable storage medium comprising instructions that, when executed by a processor, cause the processor to perform acts comprising:
receiving input that is indicative of a type of rotary energy generator that is to be emulated by an emulator, the emulator comprising an induction motor and a generator coupled thereto, the type being one of a plurality of selectable types of rotary energy generators including at least one of a diesel engine or hydrokinetic generator;
responsive to receiving the input, accessing control instructions, the control instructions based upon a model of the type of rotary energy generator, the model defining rotary response of a rotor of the type of rotary energy generator responsive to stimuli;
receiving data that is indicative of a stimulus; and
executing the control instructions, wherein executing the control instructions comprises outputting a control signal to a motor drive based upon the data that is indicative of the stimulus, the control signal causes the motor drive to control operation of the induction motor such that a velocity and torque of a rotor of the induction motor conforms to the model;
wherein the computer-readable storage medium is a non-transitory computer readable medium; and wherein the computer-executable instructions comprise an electromagnetic torque for the diesel engine determined by the equation:

$$T_{im}^* = \frac{J_{im} + J_{gen}}{J_{de} + J_{gen}}(T_{de} - \hat{T}_{gen} - B_{de}\omega_{rm}) + \hat{T}_{gen} + B_{em}\omega_{rm}$$

and
an induction motor torque for the hydrokinetic generator determined by the equation:

$$T_{IM}^* = k_{sc}\frac{B_{pto}v_m^2}{\omega_{rm} + \epsilon};$$

where $T^*_{IM}$ is the torque at the rotor of the electromechanical motor,
$J_{im}$ is a fixed moment of inertia for the electromechanical motor, $J_{gen}$ is a fixed moment of inertial for a generator, $B_{em}$ is the combined damping coefficient of the emulator, damping coefficient $B_{de}$ is a damping coefficient, $J_{de}$ is inertia, $k_{sc}$ is a scale factor, $\epsilon$ is a small value included to avoid a divide by zero, $v_m$ is a buoy velocity, $B_{pto}$ is the damping coefficient of a power take off, $T_{de}$ is diesel engine torque, $\hat{T}_{gen}$ is generator torque, and $\omega_{rm}$ is the mechanical rotor speed in radians/second.

22. The computer-readable storage medium of claim 21, wherein the type of rotary energy generator further includes a wind generator.

* * * * *